US009612706B2

(12) United States Patent
Moon et al.

(10) Patent No.: US 9,612,706 B2
(45) Date of Patent: Apr. 4, 2017

(54) METHOD AND APPARATUS FOR DISPLAYING ITEMS RELATED TO CONTENTS

(75) Inventors: Ji-bum Moon, Seoul (KR); Jung-won Lee, Seongnam-si (KR); Yoo-jin Choi, Seoul (KR); Min-jung Park, Seoul (KR); Woo-yong Chang, Yongin-si (KR); Chang-seog Ko, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1870 days.

(21) Appl. No.: 12/111,435

(22) Filed: Apr. 29, 2008

(65) Prior Publication Data
US 2009/0106675 A1  Apr. 23, 2009

(30) Foreign Application Priority Data
Oct. 19, 2007  (KR) .................. 10-2007-0105780

(51) Int. Cl.
G06F 3/048 (2013.01)
G06F 9/44 (2006.01)

(52) U.S. Cl.
CPC ............ G06F 3/048 (2013.01); G06F 9/4443 (2013.01)

(58) Field of Classification Search
USPC .................. 715/804, 781, 764, 762, 810
See application file for complete search history.

(56) References Cited

U.S. PATENT DOCUMENTS 5,689,718 A * 11/1997 Sakurai et al. ............... 715/205
7,430,713 B2 * 9/2008 Kobashi et al. .............. 715/244
7,761,812 B2 * 7/2010 Ostojic et al. ............... 715/835
7,818,688 B2 * 10/2010 Narita et al. ................. 715/841
2005/0283804 A1  12/2005 Sakata et al.
2007/0101364 A1   5/2007 Morita

FOREIGN PATENT DOCUMENTS

| KR | 1020050096654 A | 10/2005 |
| KR | 10-2006-0006843 A | 1/2006 |
| KR | 10-2006-0043199 A | 5/2006 |
| KR | 1020060107951 A | 10/2006 |

OTHER PUBLICATIONS

Communication dated Nov. 1, 2013 issued by the Korean Intellectual Property Office in counterpart Korean Patent Application No. 10-2007-0105780.
Communication dated May 23, 2014, issued by the Korean Intellectual Property Office in counterpart Korean Application No. 10-2007-0105780.

* cited by examiner

*Primary Examiner* — Matthew Ell
(74) *Attorney, Agent, or Firm* — Sughrue Mion, PLLC

(57) ABSTRACT

Provided are a method and apparatus for displaying contents-related items. The method includes using a correlation between a first attribute and a second attribute to determine values of the second attribute, wherein the first attribute is one of a plurality of attributes of the contents-related items, the second attribute is one of a plurality of attributes of a plurality of blocks which is a part or a region of a screen, and each one of the plurality of blocks corresponds to each one contents-related item; and displaying the one or more contents-related items by displaying each corresponding block having the determined value of the second attribute on the screen, wherein the first attribute and the second attribute can be quantitatively represented.

21 Claims, 13 Drawing Sheets

METHOD AND APPARATUS FOR DISPLAYING ITEMS RELATED TO CONTENTS

CROSS REFERENCE TO RELATED APPLICATIONS

This application claims priority from Korean Patent Application No. 10-2007-0105780, filed on Oct. 19, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to accessing multimedia contents (hereinafter, referred to as 'contents'), and more particularly, to displaying items related to contents (hereinafter, referred to as 'contents-related items') to be accessed on a screen.

2. Description of the Related Art

In order to access contents-related items stored in a device, the corresponding items can be displayed on a screen of the device, and one of the items can be selected so as to perform a task related to the selected item.

For example, when the contents-related item is selected, information about the contents-related items can be shown. When content is selected, the content itself can be reproduced. When a directory including contents is selected, the contents or a sub-directory included in the directory can be displayed.

In order to easily access the items related to contents, attributes related to the items can be displayed in the form of a text. For example, a size, a usage frequency, a hit count, or an accessibility in a network of the contents-related items may be displayed together with a name of each of the corresponding items.

However, related art technology has a problem in recognizing a corresponding attribute since devices use different display methods according to the type of the device. Also, where a display screen is small, another problem occurs in that it is difficult to read an attribute represented using text.

In addition, where a device attempts to access contents stored in a plurality of other devices connected to the device or to access contents in websites, it is necessary to grant uniformity to a method of displaying an attribute corresponding to items related to the contents.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a user interface by which attributes of contents-related items to be displayed can be intuitively deduced. Also, the present invention provides an interface which is uniform for different types of devices, thereby enabling the overall management of contents and easy access to the contents.

For this purpose, the present invention provides a method and apparatus for displaying one or more contents-related items to be accessed on a screen. The present invention also provides a computer readable recording medium having recorded thereon a program for executing the method of displaying one or more contents-related items, by using a computer.

The method and apparatus for displaying one or more contents-related items, according to the present invention, represent the attributes of the contents-related items to be accessed by using an attribute of a block (hereinafter, the block represents a part or a region of the screen and may take form of any geometrical shape).

According to an aspect of the present invention, there is provided a method of displaying one or more contents-related items to be accessed on a screen, the method comprising: using a correlation between a first attribute and a second attribute to determine the values of the second attribute, wherein the first attribute is one of a plurality of attributes of the contents-related items, the second attribute is one of a plurality of attributes of a block which is a part or a region of the screen, and each one block corresponds to each one contents-related item; and displaying the contents-related items by displaying the corresponding block having the determined value of the second attribute on the screen, wherein the first attribute and the second attribute can be quantitatively represented. The value of the second attribute of the block may be in proportion to the value of the first attribute of the corresponding contents-related item.

The value of the second attribute of each block may be updated when the value of the first attribute of the corresponding contents-related item is changed.

The contents-related item may include one or more of a content, a directory containing contents, a device for storing contents, and a webpage providing contents, and the first attribute of the contents-related item may be a size, a usage frequency, a hit count, or an accessibility.

When the contents-related item is a directory containing contents, the first attribute may be the number of the contents contained in the directory.

The second attribute of the block may be an area on the screen, a brightness, or a thickness of labels of the corresponding contents-related item displayed on the screen.

The displaying the contents-related item may further comprise displaying a setting block corresponding to a management menu, wherein the management menu may comprise a menu for setting or changing the first attribute and the second attribute. The setting block may be positioned in a center of the screen, and the value of the second attribute of the setting block may be fixed.

The method may further comprise showing information about the contents-related item or reproducing the contents when the corresponding block on the screen is selected.

The method may further comprise displaying contents-related items contained in a first directory when a block corresponding to the first directory is selected, by displaying blocks which correspond to the contents-related items, wherein the first attribute of the contents-related items and the second attribute of the displayed blocks are correlated.

According to an aspect of the present invention, there is provided a contents related items display apparatus for displaying one or more contents-related items to be accessed on a screen, the contents related items display apparatus comprising: an attribute value determination unit which uses a correlation between a first attribute and a second attribute to determine the values of the second attribute, wherein the first attribute is one of a plurality of attributes of the contents-related items, the second attribute is one of a plurality of attributes of a block which is a part or a region of the screen, and each block corresponds to each contents-related item; and an item display unit which displays the contents-related items by displaying the corresponding block having the determined value of the second attribute on the screen, wherein the first attribute and the second attribute can be quantitatively represented.

The screen on which one or more contents are displayed may comprise one of screens of a television (TV), an MPEG-1 Audio Layer 3 (MP3) player, a personal computer (PC) monitor, a camcorder, a printer, a digital camera, and a mobile phone.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

A method and apparatus for displaying items related to contents according to the present invention will now be described more fully with reference to the accompanying drawings, in which exemplary embodiments of the invention are shown.

Figure 1:
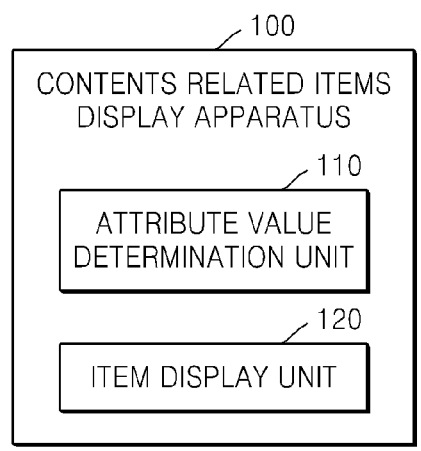
FIG. 1 is a block diagram illustrating a contents related items display apparatus according to an exemplary embodiment of the present invention.

FIG. 1 is a block diagram illustrating a contents related items display apparatus 100 according to an embodiment of the present invention.

Referring to FIG. 1, the contents related items display apparatus 100 according to an exemplary embodiment of the present invention may include an attribute value determination unit 110 and an item display unit 120.

The attribute value determination unit 110 determines a value of a second attribute which is one of a plurality of attributes of a block by using a relationship of the second attribute with a value of a first attribute which is one of a plurality of attributes of items related to contents to be displayed.

The item display unit 120 displays the items related to the contents by using a block having the determined value of the second attribute.

The items related to contents may be content itself, a directory (also known as a folder) including contents, a device for storing contents, a webpage providing contents, or the like.

The first attribute means an attribute which can be represented by quantities and which is selected from among the attributes of the items related to the contents. For example, the attributes may be a size, a usage frequency, a hit count, or an accessibility of the contents-related items.

Where the items related to the contents are the directory including the contents, the first attribute may be the number of contents included in the directory.

The second attribute is an attribute which can be quantitatively represented and which is from among the attributes of the block. For example, the attributes of the block may be an area (a surface area) of the block on a screen or a brightness of the block. A method of displaying corresponding labels of the items related to the contents on the block may be used. A thickness of the displayed labels may be the second attribute.

As noted, the block represents a part or a region of the screen and may take form of any geometrical shape. Thus, the block according to an exemplary embodiment of the present invention may be any object which can be displayed on the screen. For example, a square, a rectangle, a triangle, a circle, and the like may be used. However, for convenience of description, hereinafter, an example with reference to a quadrangle will be described.

In an exemplary embodiment of the present invention, there is a difference between the attribute and the value of the attribute. For example, in the case where the items related to the contents are music files, the first attribute may be "a size of the music contents" and the value of the first attribute may be "5" (when megabyte is selected as a unit).

In an exemplary embodiment of the present invention, the value of the second attribute of the displayed block has a correlation with the value of the first attribute of the corresponding items related to the contents. This correlation means that in the case where a value of the first attribute of a contents related item A is greater than a value of the first attribute of a contents related item B, a value of the second attribute of a block corresponding to the contents related item A is set to be greater than a value of the second attribute of a block corresponding to the contents related item B (a positive correlation). In the case where the value of the first attribute of the contents related item A is greater than the value of the first attribute of the contents related item B, it is possible to set the value of the second attribute of the block corresponding to the contents related item A to be smaller than the value of the second attribute of the block corresponding to the contents related item B (a negative correlation). In the case of the negative correlation, a value of a new first attribute may have a positive correlation with the value of the second attribute by assigning the new first attribute which has the inversed sign compared to the value of the original first attribute, or by selecting the new first attribute which has a value that is the reciprocal of the value of the original first attribute. Hereinafter, the case in which the value of the first attribute and the value of the second attribute have the positive correlation will now be described.

The value of the second attribute may be in proportion to the value of the first attribute. However, this proportion may vary according to conditions such as the size of a screen. For example, when a difference between a value of the first attribute of an item A and a value of the first attribute of an item B is great, the value of the second attribute may be in proportion to a logarithmic scale of the value of the first attribute by selecting a new first attribute which has the logarithm of the value of the first attribute as a value.

In order to conveniently access contents, a value of the first attribute may be required to be displayed. For example, when accessing contents in a website, contents having a highest usage frequency during a recent week may need to be retrieved first. The reason for providing a weekly music retrieval ranking list is that consumers using the contents may require such a retrieval criterion.

Related art technology displays such a value of the first attribute by using text but users may have difficulty in recognizing the text. In an exemplary embodiment of the present invention, the value of the first attribute is displayed by using a value of the second attribute of the block, and thus, the users may intuitively recognize the value of the first attribute and may easily access the items related to the contents.

Also, when the value of the first attribute of the items related to contents is changed, the value of the second attribute of the corresponding block may be correspondently changed. For example, if contents in a website are displayed based on a hit count for the contents, wherein the hit count is set as the first attribute, when the hit count for the contents is changed, a corresponding value of a second attribute (e.g., an area) of the block may be changed in real-time. In this manner, it is possible to know in real-time about variation in the hit count for the contents in the website.

A screen on which contents are to be displayed may be a screen of various devices such as a television (TV), an MPEG-1 Audio Layer 3 (MP3) player, a personal computer (PC) monitor, a camcorder, a printer, a digital camera, a mobile phone, and the like.

The exemplary embodiment of the present invention may uniformly apply the display method to different devices, thereby enabling the overall management of contents and easy access to the contents.

Figure 2:
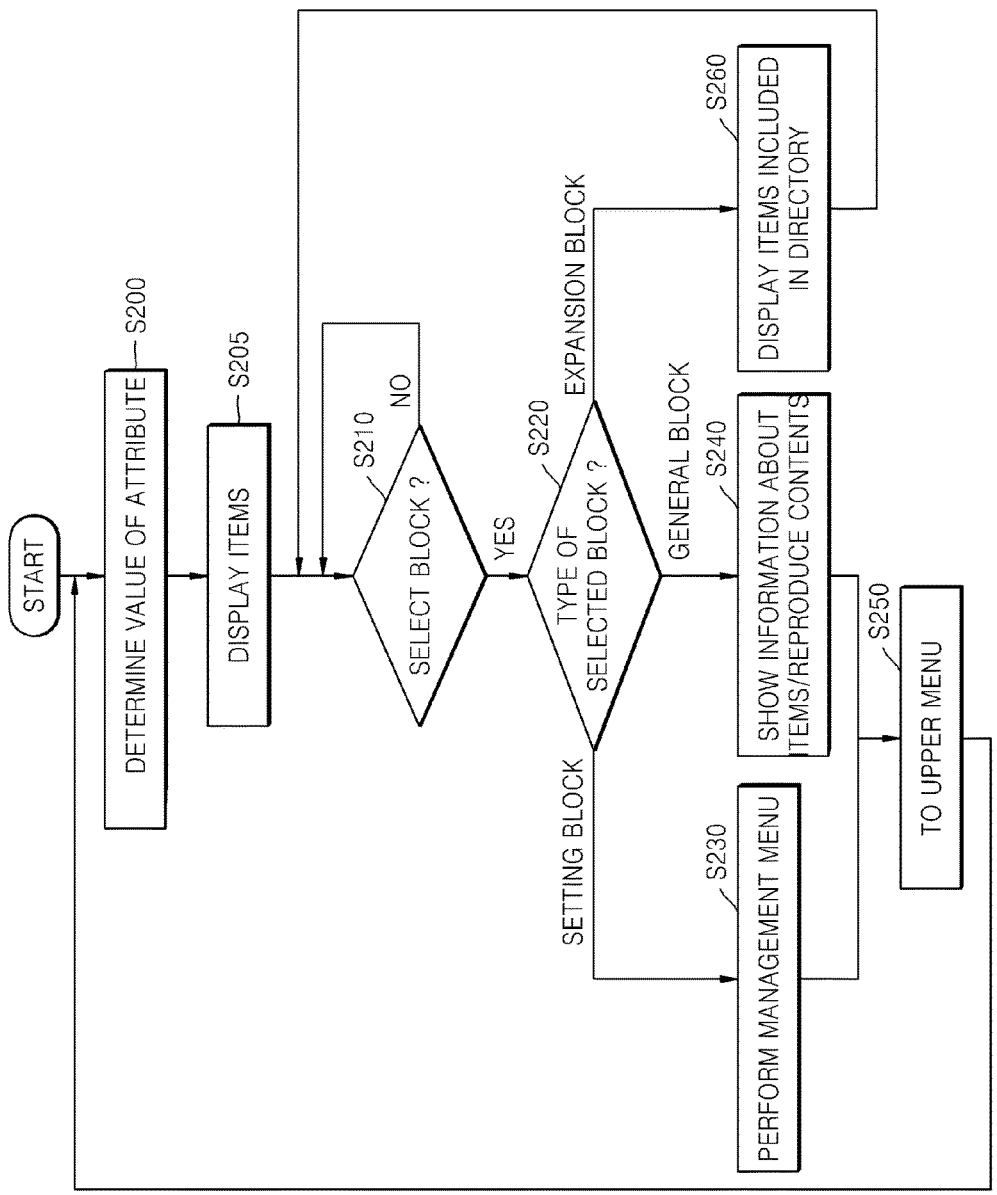
FIG. 2 is a flowchart of a method of displaying items related to contents, according to an exemplary embodiment of the present invention.

FIG. 2 is a flowchart of a method of displaying items related to contents, according to an exemplary embodiment of the present invention.

First, a value of a second attribute is determined by using a correlation of the second attribute with a value of a first attribute of corresponding items related to contents (operation S200). The corresponding contents-related items are displayed by using a block having the determined value of the second attribute (operation S205).

A wait operation is performed until one of a plurality of displayed blocks is selected (operation S210). When one of the plurality of displayed blocks is selected, a type of the selected block is determined (operation S220).

The block to be displayed on the screen according to an exemplary embodiment of the present invention may include one of three types, as described below.

(1) First, a setting block is a block for displaying a management menu. When the setting block is selected, functions related to the management menu are performed (operation S230).

In order to provide a uniform interface, the setting block may be positioned in a center of the screen. However, the position of the setting block is not limited thereto, and may also be in the bottom or a lower left corner of the screen. The setting block may be positioned in a fixed position on the screen.

For the management menu, a value of the first attribute may also be changed. However, a value of the second attribute of the setting block corresponding to the management menu may not be changed. For example, in the case where an area of the block is selected as the second attribute, the area of the setting block may remain a first displayed value.

The management menu may perform general managing functions and may include a menu for setting or changing the first and second attributes. For example, the first attribute may be a size but may be changed to a hit count.

After the functions of the management menu are performed, when a move command, which requires moving to an upper menu, is input, the upper menu is displayed again (operation S250).

(2) A general block is a block which corresponds to general items related to contents except for a directory including contents or a device for storing contents. When the general block is selected, information about the contents-related item is shown or content is reproduced (operation S240). For example, when the general block corresponding to video contents is selected, the corresponding video contents is reproduced.

(3) An expansion block is a block which corresponds to a directory or a device which include items related to contents. When the expansion block is selected, the items related to contents included in the corresponding directory or device (hereinafter, called a sub-directory, or a sub-device) are displayed (operation S260). When the items related to contents included in the sub-directory, etc are displayed, an interface identical with that of an upper directory may have to be maintained. That is, the contents-related items may be displayed by using a block which has a value of the second attribute having a relationship with a value of the first attribute of the items related to contents included in the sub-directory, or the sub-device.

In the flowchart of FIG. 2, operation S260 for the sub-directory, or the sub-device corresponds to operations S200 and S205 which are for the upper directory. Thus, after performing operation S260, the operations following operation S210 are performed on displayed blocks related to the sub-directory, or the sub-device.

Figure 3:
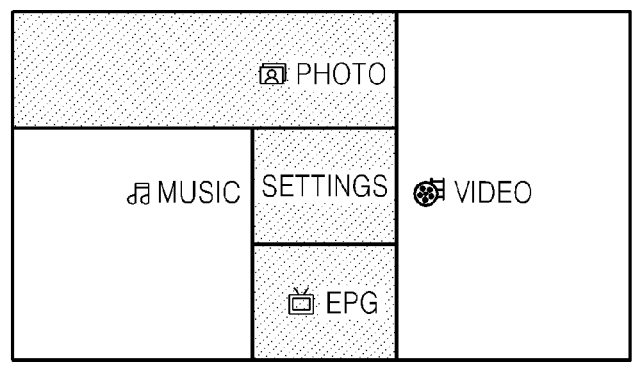
FIG. 3 is a diagram illustrating an example of a screen on which items related to contents are displayed after the method of displaying the items related to the contents according to an exemplary embodiment of the present invention is performed.

FIG. 3 is a diagram illustrating an example of a screen on which items related to contents are displayed after the method of displaying the items related to the contents according to an exemplary embodiment of the present invention is performed.

Referring to FIG. 3, the setting block labeled "Settings" is positioned in the center of the screen. The size of the setting block may not be changed.

In the example of the FIG. 3, the displayed contents-related items may be directories respectively including contents which are respectively represented by each label, the first attribute may be the number of contents included in each of the directories, and the second attribute may be an area of a block. In this case, users may intuitively recognize that the number of contents included in a video contents directory "Video" is greater than the number of contents included in a music contents directory "Music".

Also, if the screen of illustrated in FIG. 3 is a screen of a webpage providing contents and the first attribute is a hit count per content, the users may intuitively recognize that users using the corresponding webpage have used the video contents more frequently than the music contents.

Figure 4:
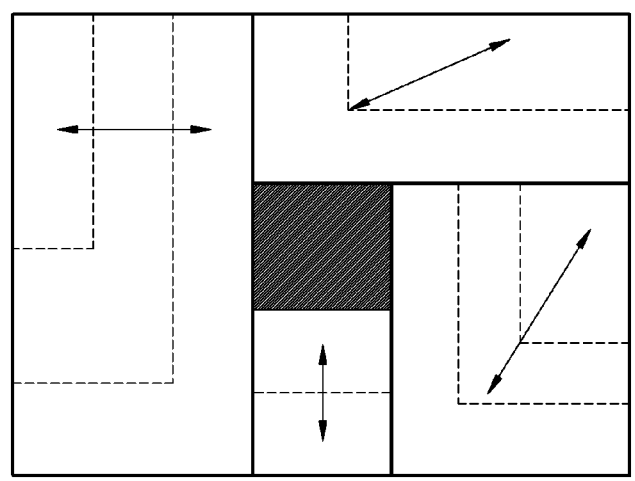
FIGS. 4 through 6 are diagrams illustrating examples in which a second attribute of a block is changed by an exemplary embodiment of the present invention.
Figure 5:
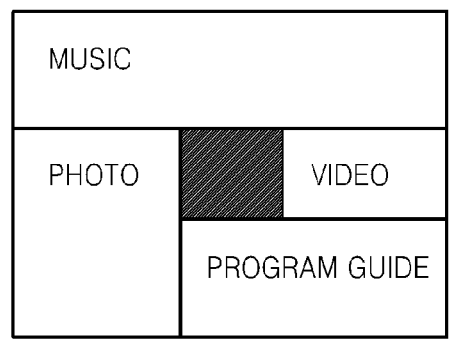
Figure 6:
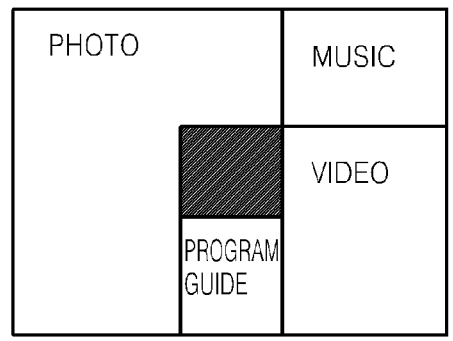

FIGS. 4 through 6 are diagrams illustrating examples in which a second attribute of a block is changed by an exemplary embodiment of the present invention.

In the examples of FIGS. 4 through 6, the size of content and an area of a block are respectively selected as a first attribute and a second attribute.

In the example of FIG. 4, when the size of each content is changed, the corresponding area of the block is changed.

FIGS. 5 and 6 respectively illustrate a status of a screen before and after the size of each content is changed.

Compared to the example of FIG. 5, in the example of FIG. 6, the size of photo contents "Photo" and the size of video contents "Video" are increased, and the size of music contents "Music" and the size of program guide contents "Program Guide" are decreased.

In an exemplary embodiment of the present invention, the size of the contents and the area of the block do not have to be proportional to each other. It is acceptable if variations in the size of the contents can be intuitively recognized by displaying variations in the area of the block.

Figure 7:
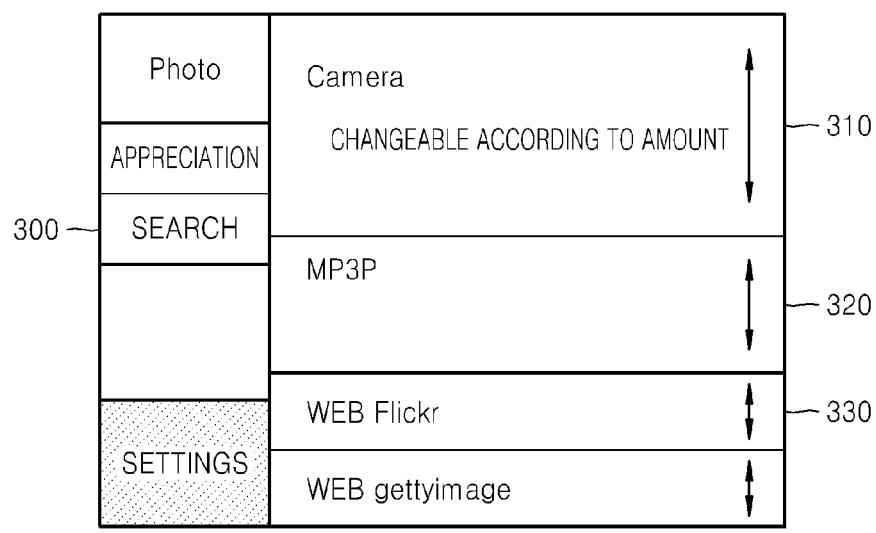
FIG. 7 is a diagram illustrating a screencap which is displayed on a screen in the case where a directory, including items related to photo contents, is selected according to an exemplary embodiment of the present invention.

FIG. 7 is a diagram illustrating a screencap which is displayed on a screen in the case where a directory including items related to photo contents is selected.

On the left side, a label "Photo" for indicating that the corresponding directory is related to the photo contents, and a related task menu, denoted by a reference numeral 300, are displayed. In a lower left corner, a setting block corresponding to a management setting menu is displayed.

On the right side, devices and webpages, each of which stores the photo contents, are displayed. By adding not only the devices but also the webpages in a list of the items related to the contents, it is possible to access the Internet by using each of the contents.

The example of FIG. 7 indicates that a camera 310 and an MP3 player (MP3P) 320 are used as the devices.

In the example of FIG. 7, the amount of each device or the amount of each webpage is set as the first attribute, and when the amount is changed, a corresponding area of a block is changed.

Figure 8:
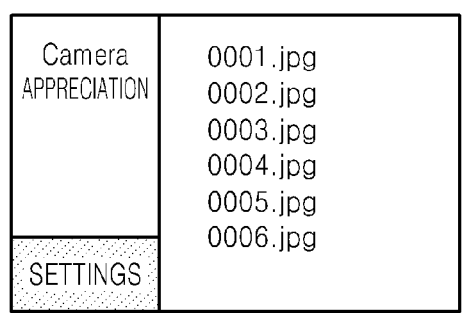
FIG. 8 is a diagram illustrating an example in which contents of a camera are displayed when the camera is selected according to an exemplary embodiment of the present invention.

FIG. 8 is a diagram illustrating an example in which contents of the camera 310 are displayed when the camera 310 is selected. In an exemplary embodiment of the present invention, if necessary, it is possible to use an interface which is different from that of an upper level. In the example of FIG. 8, only a current device "Camera", a related task "Appreciation", and a management menu "Settings" are displayed by using a block, and the photo contents stored in the camera 310 are displayed using only a title.

Figure 9:
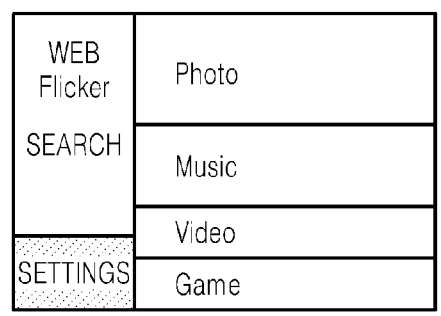
FIG. 9 is a diagram illustrating an example in which items related to contents in a webpage are displayed when a webpage is selected according to an exemplary embodiment of the present invention.

FIG. 9 is a diagram illustrating an example in which items related to contents in a webpage are displayed when a webpage "Flicker" 330 is selected.

Figure 10:
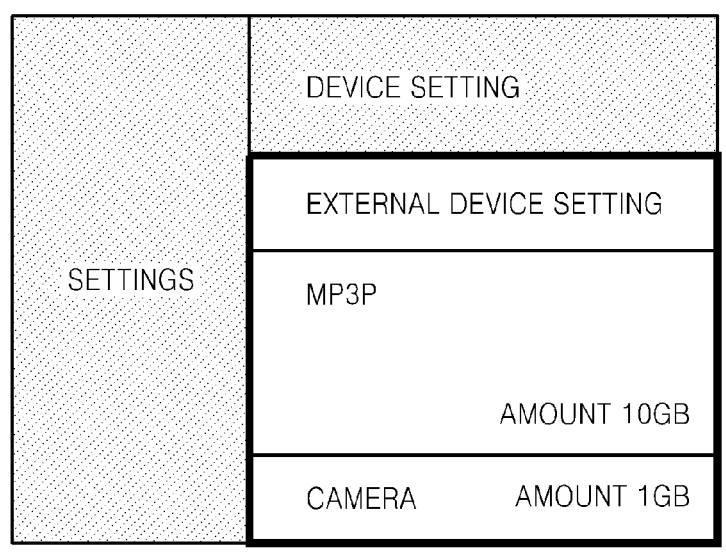
FIG. 10 is a diagram illustrating an example of a management menu according to an exemplary embodiment of the present invention.

FIG. 10 is a diagram illustrating an example of a management menu according to an exemplary embodiment of the present invention. When the setting block is selected, the management menu is displayed (operation S230 in relation to FIG. 2). Referring to FIG. 10, a menu related to a device setting is displayed. In the management menu, a value of the first attribute of items related to contents to be managed may be displayed by using a value of the second attribute of a block. In the example of FIG. 10, regarding external devices to be managed, the amount of each device is represented by the largeness and smallness of an area of a block.

Figure 11:
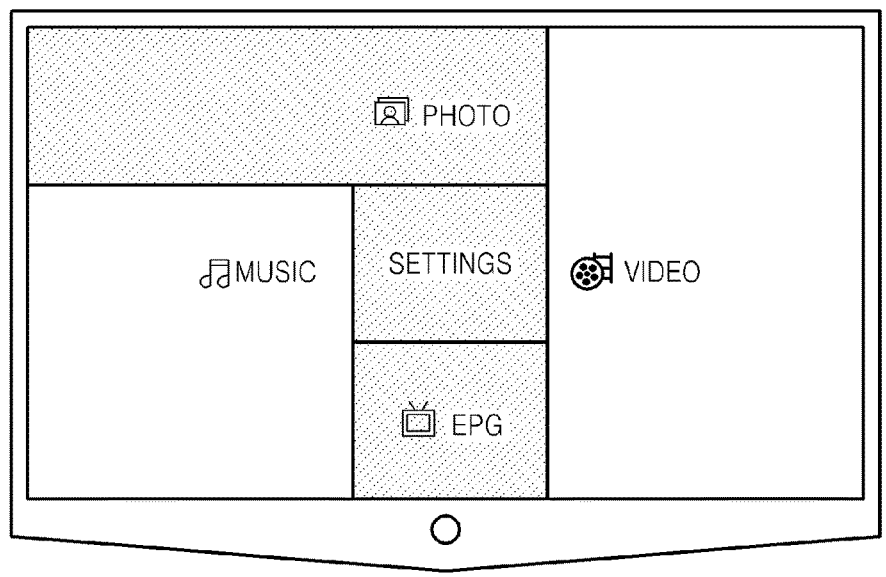
FIGS. 11 and 12 are diagrams illustrating examples in which the method of displaying the items related to contents according to an exemplary embodiment of the present invention is performed.
Figure 12:
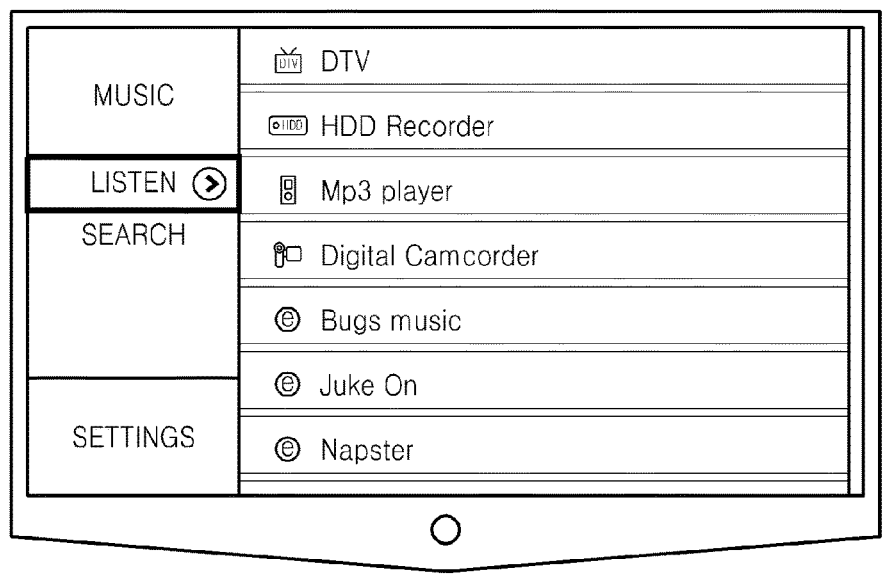

FIGS. 11 and 12 are diagrams illustrating examples in which the method of displaying the items related to contents according to an exemplary embodiment of the present invention is performed.

In FIG. 11, when a block "Music" corresponding to a music contents directory is selected, items related to music contents are displayed as illustrated in FIG. 12.

In the example of FIG. 12, tasks related to the music contents are illustrated on the left side of a screen, and devices and webpages, each of which stores the music contents, are displayed on the right side of the screen. In particular, in the example of FIG. 12, a block "Listen" corresponding to a reproducing task from among the tasks related to the music contents is selected.

Figure 13:
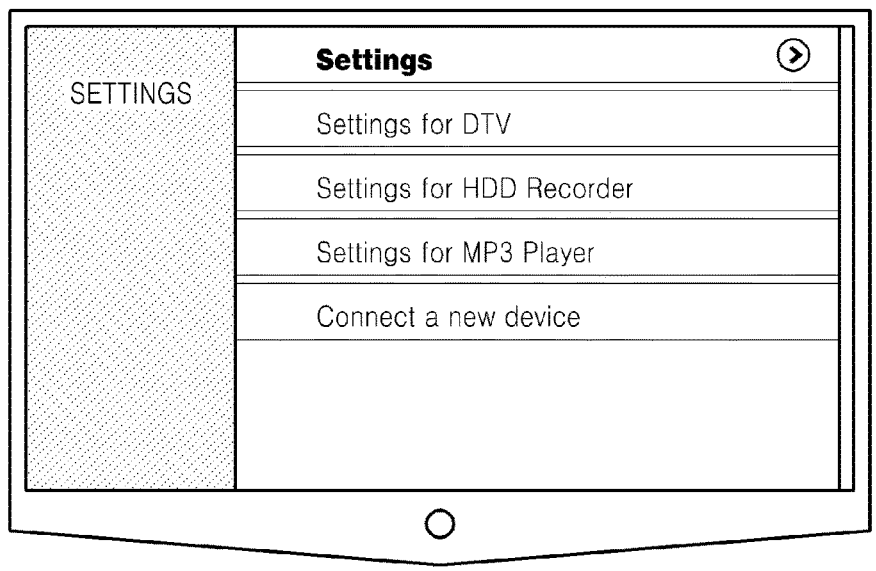
FIG. 13 is a diagram illustrating an example in which a setting menu is selected on a television (TV) screen according to an exemplary embodiment of the present invention.

FIG. 13 is a diagram illustrating an example in which a setting menu is selected on a TV screen according to an exemplary embodiment of the present invention. In the example of FIG. 13, the setting menu displayed on the TV screen indicates that a digital TV (DTV), a hard disk drive (HDD) recorder, an MP3 player, etc are connected, and also displays a menu item for connecting a new device.

As described above, the method of displaying the items related to contents according to an exemplary embodiment of the present invention may provide a uniform interface to different devices.

FIGS. 14 through 20 are diagrams illustrating examples in which the display method according to an exemplary embodiment of the present invention is applied to a variety of devices.

Figure 14:
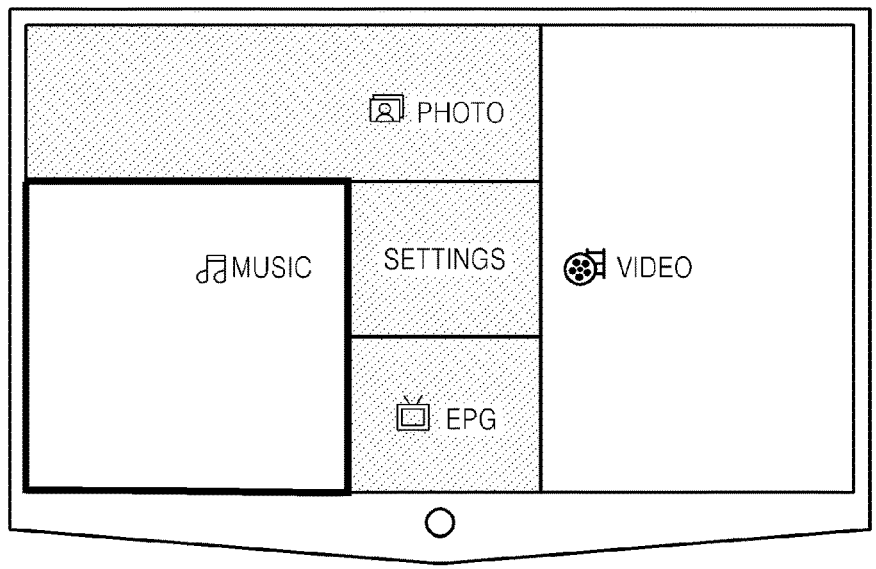
FIG. 14 is a diagram illustrating an exemplary embodiment in which the present invention is applied to a TV screen.

FIG. 14 is a diagram illustrating an exemplary embodiment in which the present invention is applied to a TV screen.

Figure 15:
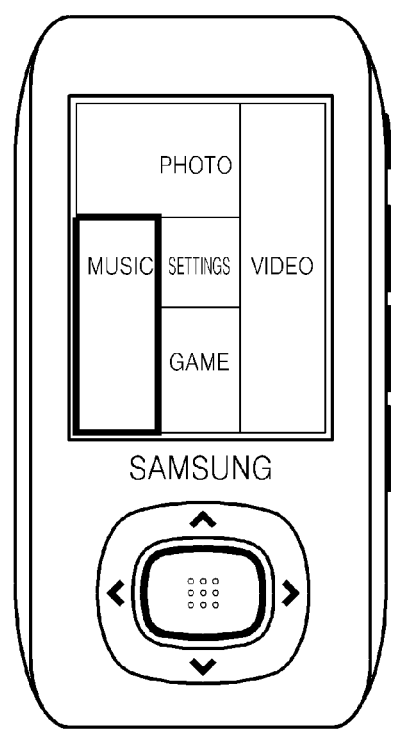
FIG. 15 is a diagram illustrating an example in which an exemplary embodiment of the present invention is applied to an MPEG-1 Audio Layer 3 (MP3) player screen.

FIG. 15 is a diagram illustrating an exemplary embodiment in which the present invention is applied to an MP3 player screen.

Figure 16:
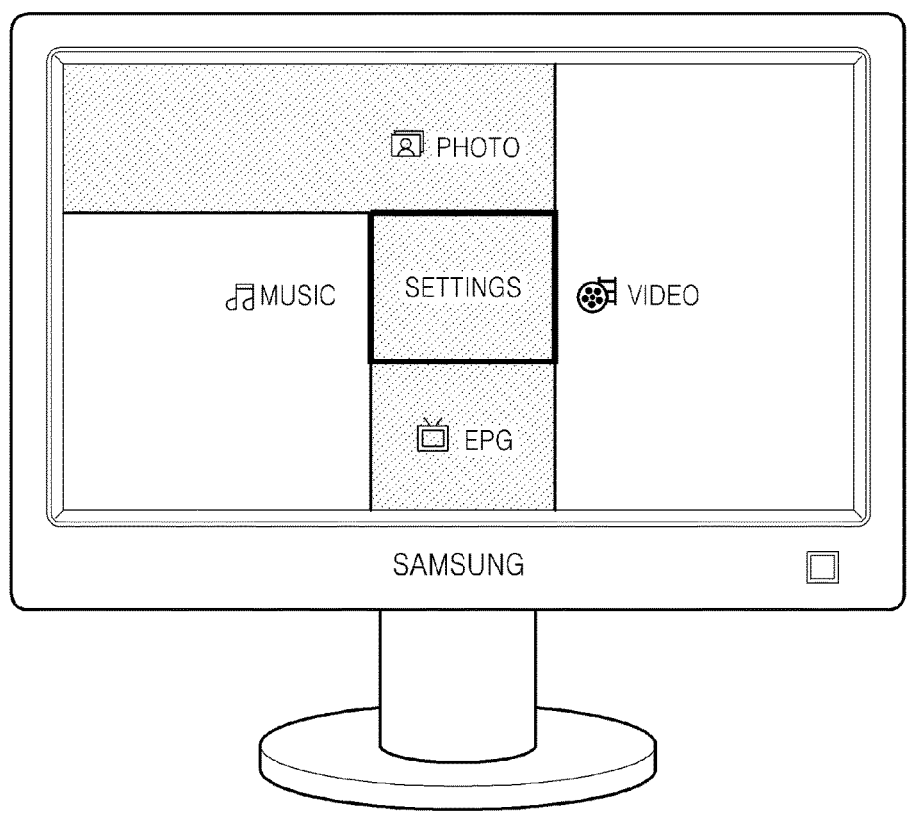
FIG. 16 is a diagram illustrating an example in which an exemplary embodiment of the present invention is applied to a personal computer (PC) monitor screen.

FIG. 16 is a diagram illustrating an exemplary embodiment in which the present invention is applied to a PC monitor screen.

Figure 17:
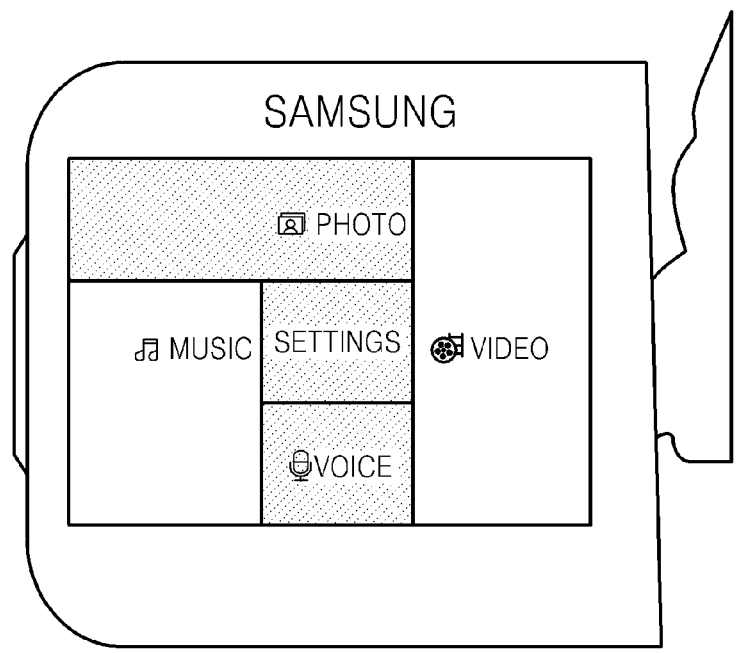
FIGS. 17 and 18 are diagrams illustrating examples in which an exemplary embodiment of the present invention is respectively applied to screens of a camcorder and a printer.
Figure 18:
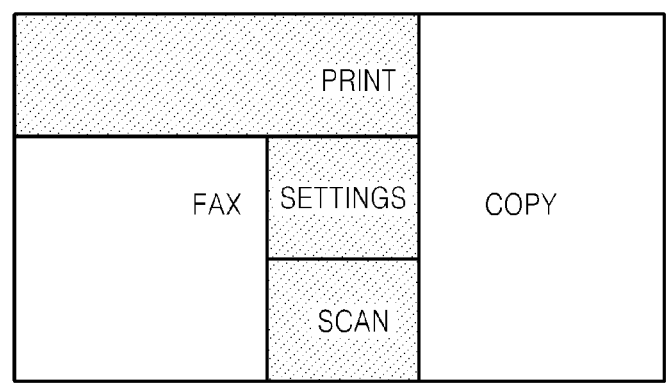

FIGS. 17 and 18 are diagrams illustrating exemplary embodiments in which the present invention is respectively applied to screens of a camcorder and a printer.

Figure 19:
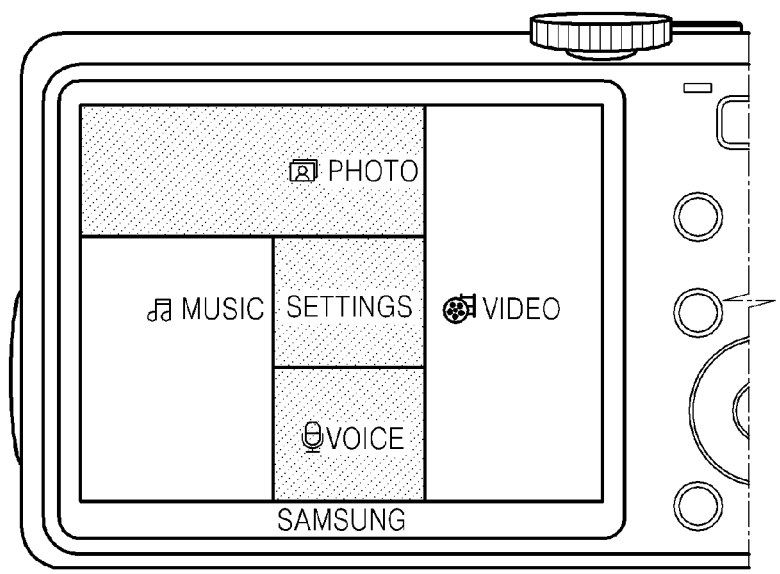
FIGS. 19 and 20 are diagrams illustrating examples in which an exemplary embodiment of the present invention is respectively applied to screens of a digital camera and a mobile phone.
Figure 20:
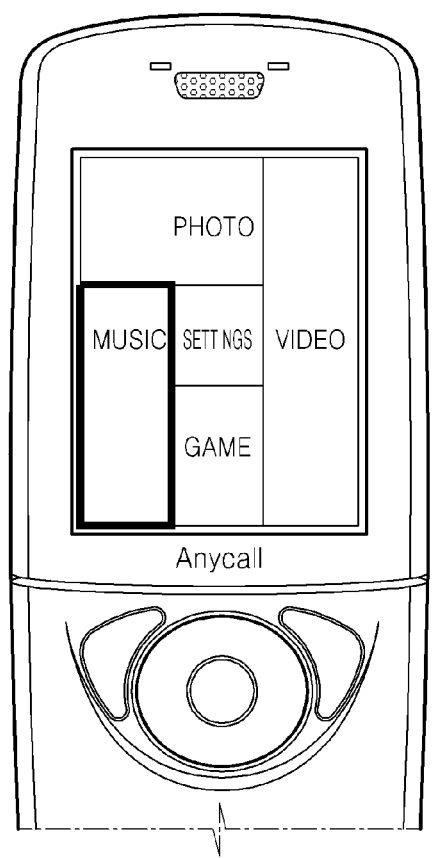

FIGS. 19 and 20 are diagrams illustrating exemplary embodiments in which the present invention is respectively applied to screens of a digital camera and a mobile phone.

Referring to FIGS. 14 through 20, since attributes (such as a size, usage frequency, etc) of the items related to contents are displayed by using attributes (such as an area, brightness, etc) of a block, attributes of the corresponding items related to contents may be intuitively recognized via not only a large screen but also a small screen.

In addition, the display method is uniformly applied to various types of devices, thereby enabling the overall management of contents and easy access to the contents.

The method and apparatus for displaying the items related to contents, according to exemplary embodiments of the present invention, display the items related to contents by using a block having attributes which can be intuitively recognized, and thus, attributes of an item to be accessed can be intuitively recognized, thereby enabling easy access to the items.

Also, exemplary embodiments of the present invention can provide a uniform interface by applying such method to all types of devices, thereby enabling the overall management of contents and easy access to the contents.

The invention can also be exemplarily embodied as computer readable codes on a computer readable recording medium. Here, a computer includes all types of devices having an information processing function. The computer readable recording medium is any data storage device that can store programs or data which can be thereafter read by a computer system. Examples of the computer readable recording medium include read-only memory (ROM), random-access memory (RAM), CD-ROMs, magnetic tapes, hard disks, floppy disks, flash memory, optical data storage devices, and so on.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of displaying two or more contents-related items to be accessed on a screen, the method comprising:
   determining a value of a second attribute of a contents-related item as a result of comparing a first attribute of the contents-related item with a first attribute of another contents-related item of the two or more contents-related items; and
   displaying the two or more contents-related items by displaying each corresponding block having the determined value of the second attribute on the screen,
   wherein the first attribute and the second attribute are quantitatively represented,
   wherein respective second attributes of the each one of the plurality of blocks relate to each other, and
   wherein the first attribute of the contents-related item is one of a plurality of attributes of the two or more contents-related items, the second attribute is one of a plurality of attributes of a plurality of blocks, wherein each one of the plurality of blocks represent a part or a region of a screen, and each one of the plurality of blocks corresponds to each one contents-related item.

2. The method of claim 1, wherein a value of the second attribute of the block is in proportion to a value of the first attribute of the corresponding two or more contents-related item.

3. The method of claim 1, wherein the value of the second attribute of each of the plurality of blocks is updated when the value of the first attribute of the corresponding one contents-related item is changed.

4. The method of claim 1, wherein the two or more contents-related items each comprise one or more of a content, a directory containing contents, a device for storing contents, and a webpage providing contents.

5. The method of claim 1, wherein the first attribute of each of the two or more contents-related item comprises a size, a usage frequency, a hit count, or an accessibility.

6. The method of claim 1, wherein the two or more contents-related items comprises a directory containing contents and the first attribute of the two or more contents-related items comprises a number of the contents contained in the directory.

7. The method of claim 1, wherein the second attribute comprises an area on the screen, a brightness, or a thickness of labels of the corresponding two or more contents-related items displayed on the screen.

8. The method of claim 1, wherein the displaying of the two or more contents-related items further comprises displaying a setting block corresponding to a management menu.

9. The method of claim 8, wherein the management menu comprises a menu for setting or changing the first attribute and the second attribute.

10. The method of claim 8, wherein the setting block is positioned in a center of the screen.

11. The method of claim 8, wherein the value of the second attribute of the setting block is fixed.

12. The method of claim 1, further comprising showing information about the two or more contents-related items.

13. The method of claim 12, further comprising reproducing the contents when the corresponding block on the screen is selected.

14. The method of claim 1, further comprising displaying two or more contents-related items contained in a first directory when a block corresponding to the first directory is selected, by displaying blocks which correspond to the two or more contents-related items, wherein the first attribute of the contents-related item and the second attribute of the displayed blocks are correlated.

15. A contents related items display apparatus for displaying two or more contents-related items to be accessed on a screen, the contents related items display apparatus comprising:
   an attribute value determination unit which determines a value of a second attribute of a contents-related item as a result of comparing a first attribute of the contents-related item with a first attribute of another contents-related item of the two or more contents-related items,
   wherein the first attribute of the contents related item is one of a plurality of attributes of the two or more contents-related items, the second attribute is one of a plurality of attributes of a block which is a part or a region of the screen, and each one of a plurality of blocks corresponds to each one of the two or more contents-related items; and
   an item display unit which displays the two or more contents-related items by displaying each corresponding block having the determined value of the second attribute on the screen,
   wherein the first attribute and the second attribute are quantitatively represented, and
   wherein respective second attributes of the each one of the plurality of blocks relate to each other.

16. The contents related items display apparatus of claim 15, wherein the value of the second attribute of each block is updated when a value of a first attribute of the corresponding two or more contents-related items is changed.

17. The contents related items display apparatus of claim 15, wherein the screen on which two or more contents-related items are displayed comprises one of screens of a TV (television), an MP3 (MPEG-1 Audio Layer 3) player, a PC (personal computer) monitor, a camcorder, a printer, a digital camera, and a mobile phone.

18. The contents related items display apparatus of claim 15, wherein the each of the two or more contents-related items comprises one or more of a content, a directory containing contents, a device for storing contents, and a webpage providing contents.

19. The contents related items display apparatus of claim 15, wherein the first attribute of each of the two or more contents-related items comprises a size, a usage frequency, a hit count, or an accessibility.

20. The contents related items display apparatus of claim 15, wherein the second attribute comprises an area on the screen, a brightness, or a thickness of labels of the corresponding two or more contents-related items displayed on the screen.

21. A non-transitory computer readable recording medium having recorded thereon a program for executing a method of displaying two or more contents-related items to be accessed on a screen by using a computer, the method comprising:

determining a value of a second attribute of a contents-related item as a result of comparing a first attribute of the contents-related item with a first attribute of another contents-related item of the two or more contents-related items; and displaying the two or more contents-related items by displaying each corresponding block having the determined value of the second attribute on the screen, wherein the first attribute and the second attribute are quantitatively represented, wherein respective second attributes of the each one of the plurality of blocks relate to each other, and wherein the first attribute of the contents-related item is one of a plurality of attributes of the two or more contents-related items, the second attribute is one of a plurality of attributes of a plurality of blocks, wherein each one of the plurality of blocks represent a part or a region of a screen, and each one of the plurality of blocks corresponds to each one contents-related item.

* * * * *